Patented Oct. 31, 1922.

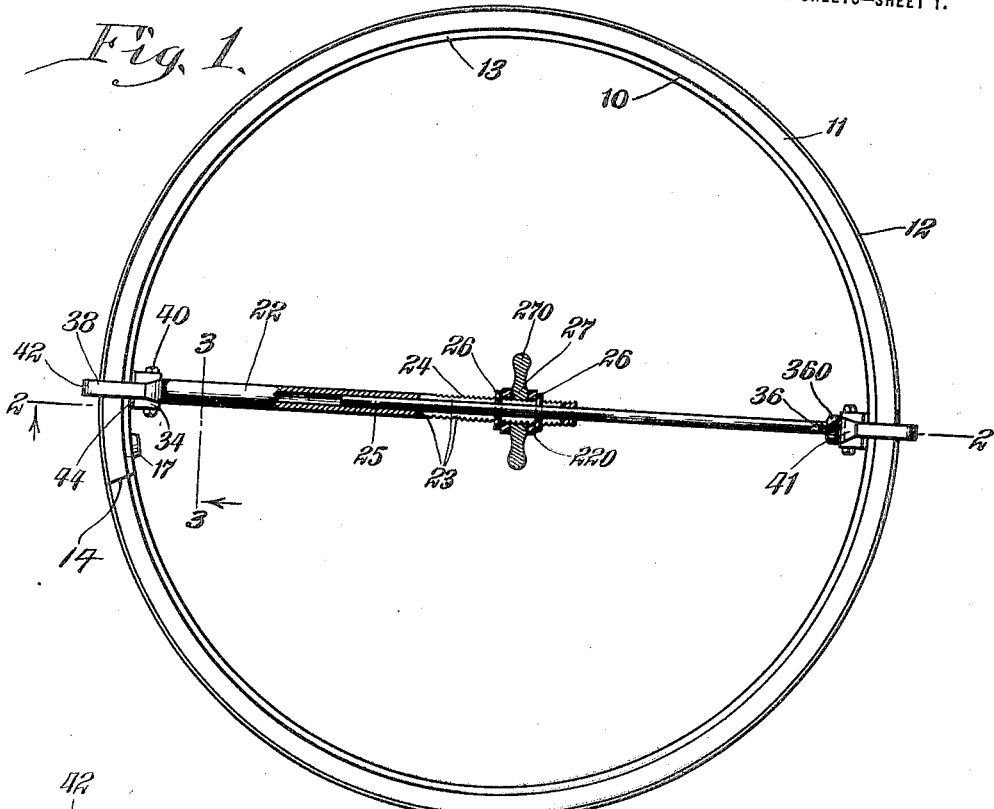

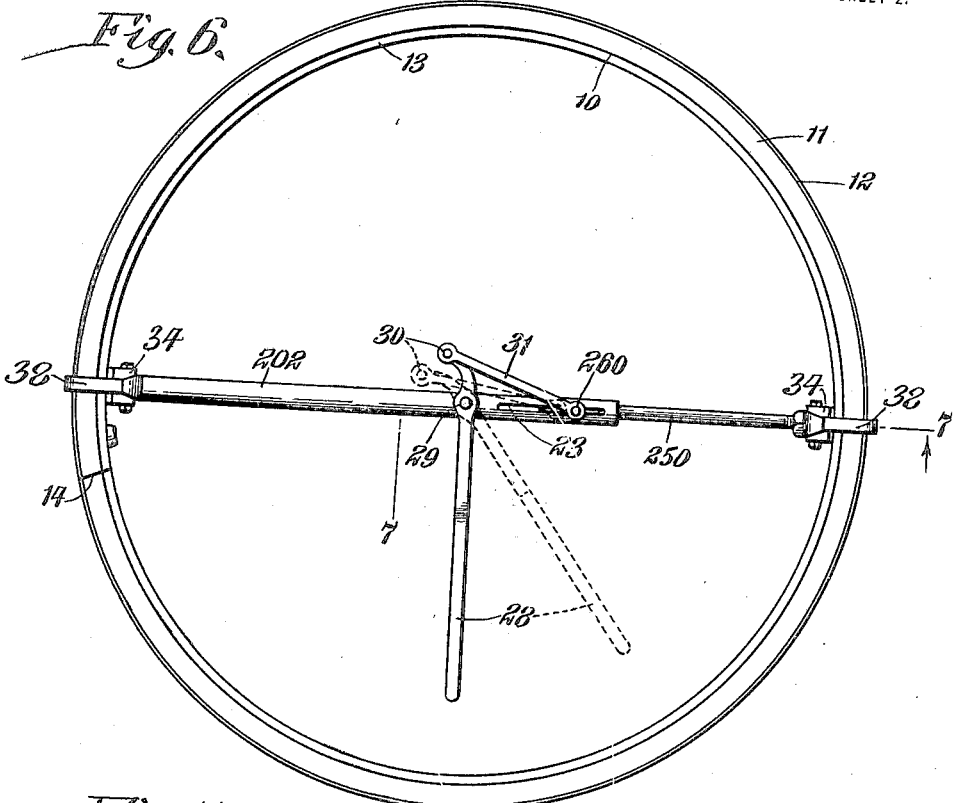
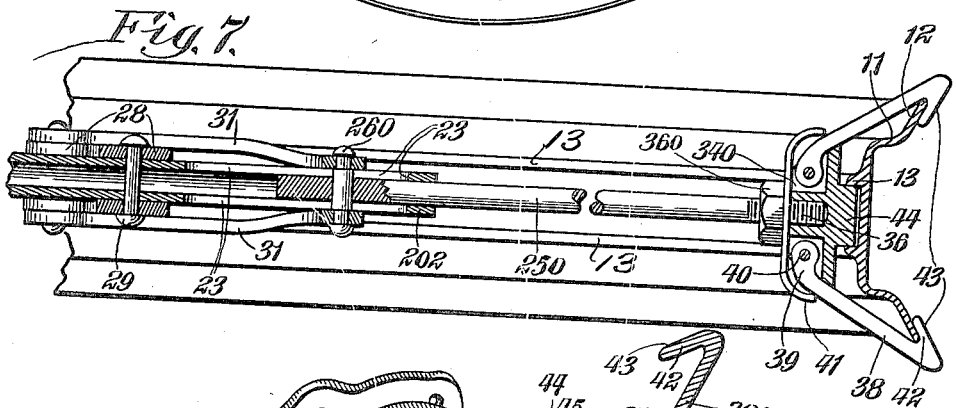
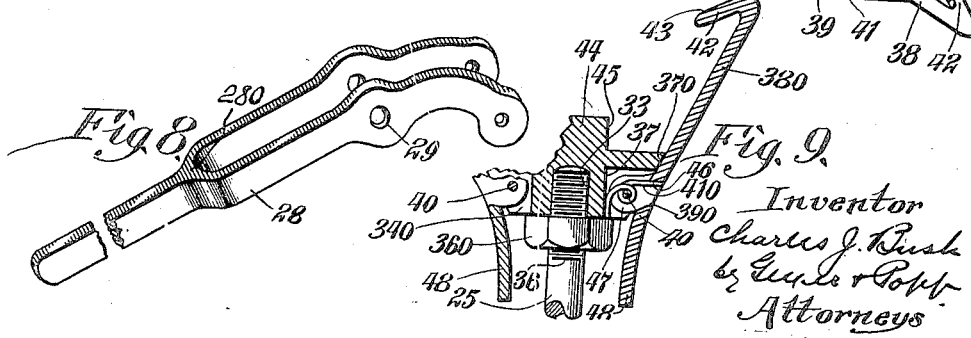

1,433,779

UNITED STATES PATENT OFFICE.

CHARLES J. BUSH, OF BUFFALO, NEW YORK.

AUTOMOBILE RIM TOOL.

Application filed March 24, 1919. Serial No. 284,792.

*To all whom it may concern:*

Be it known that I, CHARLES J. BUSH, a citizen of the United States, residing in Buffalo, in the county of Erie and State of New York, have invented new and useful Improvements in Automobile Rim Tools, of which the following is a specification.

This invention relates to a tool for manipulating split demountable automobile tire rims, so as to sufficiently flex the same and thereby permit of either putting the usual rubber, automobile tire onto the rim, or of removing the same therefrom.

The object of the invention is to produce a simple and inexpensive rim tool, whose action is largely automatic and is easily operated and understood by a person unfamiliar with mechanical devices. A further object is to produce a tool that can be compactly stowed away and which is not made up of a number of loose parts, but is rigid in structure and positive in action.

In the accompanying drawings:

Figure 1 is a side elevation, partly in section, of a tire rim with my improved rim tool applied thereto. Figure 2 is a diametrical section taken on line 2—2, Fig. 1. Figure 3 is an enlarged fragmentary vertical section taken on line 3—3, Fig. 1. Figure 4 is an enlarged longitudinal, fragmentary section taken on line 4—4, Fig. 3. Figure 5 is an enlarged outside view of one of the catch heads detached. Figure 6 is a side elevation of the tire rim with a modified form of my improved rim tool applied thereto. Figure 7 is an enlarged fragmentary section taken on line 7—7, Fig. 6. Figure 8 is an enlarged perspective view of the operating lever employed in the construction shown in Figs. 6 and 7. Figure 9 is a fragmentary section of a catch head showing a modified form of catch spring and engaging catch associated therewith.

Similar characters of reference refer to like parts throughout the several views.

10 represents a channel-shaped tire rim, which is adapted to be applied to or removed from an automobile wheel and which is arranged to detachably carry the ordinary rubber, automobile tire. My improved rim tool can be used with practically any type of split tire rim, but for purposes of description, a typical rim has been shown in the drawings so as to exhibit clearly the novel cooperation between the rim and my improved tire tool whereby the action of the tool is rendered largely automatic. The peripheral flanges of this metal tire rim form outside, lateral rim faces 11 and peripheral beads or rim edges 12, and, usually also, the tire rim will be provided with two annular flanges 13 extending inwardly from the tire rim proper forming an annular channel on the inner side of the same. 14 designates the usual split in the tire rim, whereby the rim, in the usual and customary manner, can be made of smaller diameter, so as to permit of readily applying an automobile tire to or removing the same therefrom. The rim is usually provided at one end, adjacent to the split 14, with a transverse locking notch 15, which is adapted to receive an outwardly projecting locking lug 16 arranged at the outer end of an overlapping locking bar 17, that is secured by rivets 170 to the adjacent other end of the tire rim. This locking bar is adapted to be held outwardly in its operative position by means of a turn button 18, whose inner beveled face 19 is adapted to engage with a bevel surface 20 formed at the outer end of the inner face of the locking bar 17 adjacent to the finger 16 thereof. When the tire rim is to be unlocked, the button 18 is turned halfway around from the position shown in the drawings until its flat side 21 registers with the flat outer end of the locking bar 17 after which that end of the rim carrying said locking bar is moved inwardly relatively to the other end thereof and the tire removed or applied as the case may be.

My improved rim tool may be varied considerably in mechanical detail without departing from the spirit of the invention, but a practical embodiment thereof is shown in Figs. 1-5 inclusive and as there shown, is constructed as follows:

Adapted to extend diametrically across the space within the rim is a longitudinally extensible and contractible support which is of telescopic form and comprises a round hollow guide tube 22 and a rod 25 sliding in said tube. The guide tube is provided adjacent to its inner end and on diametrically opposite sides with two longitudinal guide slots 23, said guide tube being also provided with an external screw thread 24 adjacent to and approximately equal in length to the slots 23. The slide rod 25 is provided, near its inner end, with two diametrical thrust pins 26 whose ends project outwardly through the slots 23 of the guide tube and beyond the sides of the latter. Engaging the external screw thread 24 of the guide tube and fitting snugly between the thrust pins 26 is a rotatable screw nut 27, which when manually turned by means of its handles 270, presses against one or the other of the thrust pins and thereby causes the slide rod 25 to move inwardly or outwardly relatively to the guide tube. It is preferable to interpose a pair of anti-friction washers 220, between the end faces of the screw nut 27 and the thrust pins, as shown.

The outer end of the guide tube 22 is provided with an internal screw thread which receives a correspondingly threaded stud 32 which is set in a tappd hole 33 of a thrust block or head piece 34. This stud is secured to the head piece by a pin 35 or otherwise and the guide tube is tightly screwed up on said stud thereby rigidly securing the guide tube to the head piece. Similarly, the slide rod 25 is provided at its outer end with an exterior screw thread 36 which engages a similarly tapped hole 33 in the other head piece 34. Also engaging the screw thread on the slide rod is a lock nut 360 whereby the slide rod is rigidly secured to its companion head piece.

Each of the head pieces is provided at its opposite ends with two square-sided pockets or lateral recesses 37, and a limiting shoulder or catch stop 370 adjacent to the outer end of each recess. Arranged laterally on the outside of each head piece 34, are two retaining hooks or catches 38 provided at their inner ends with hubs 39 which extend into the square sided pockets 37 and are pivoted to the head piece by means of transverse pivots 40. Each of these pivots is supported at both ends by the opposite longitudinal supporting walls 340 of the companion pocket 37, so that a very strong pivotal construction is thereby effected. Arranged transversely on the inner side of each head piece and secured thereto is a flat, catch spring 41 having its ends tapered and curled outwardly and arranged to bear against the outer faces of the hooks or catches 38. One catch spring is gripped between one of the head pieces 34 and the outer end of the guide tube 22 while the other catch spring is gripped between the other head piece and the lock nut 360. Thus each catch 38 by reason of its spring is yieldingly forced toward its companion catch and normally pressed against its companion catch stop 370 although free to swing in the opposite direction about the pivot 40 and retained between the two flat inner faces of the walls 340.

The outer ends of each pair of catches 38 are provided with inclined gripping lips 42 extending toward each other and also toward the center of the tire rim when applied to the latter. The outer surfaces of the gripping lips form inclined cam faces 43 which are adapted to automatically cause the catches to open up as the head piece is moved outwardly against the rim. When the head piece has thus moved outward sufficiently, the yielding spring 41 then causes the catches to move toward each other, thereby permitting the engaging lips to hook over the outer bead or rim edges 12 of the tire rim, so that thereafter when the head is moved inwardly toward the center of the rim it produces an inward pressure on the latter. Centrally on its outer side each head piece is provided with a square faced lug 44 the two lateral faces 45 of which constitute aligning faces. This lug is adapted to seat itself in the inner channel or groove of the tire rim between the annular flanges 13 thereof and the said aligning faces 45 are adapted to bear against the inner faces of these flanges so as to prevent the head piece from turning on the rim. By this means each head piece automatically aligns itself on the rim and the engaging catches 38 are always constrained to swing perpendicularly to the rim so that said catches snap over the rim edges 12 and wedge in between said edges and the side of the rubber tire. To further avoid turning of the head piece on the rim, the gripping lips 42 have a considerable width as shown in Figs. 1, 3 and 6, so that they tend to throw themselves and the head piece to which they are attached into proper alignment. This is a particularly valuable feature when the tire tool is being used on a rim which is not equipped with the annular flanges 13. But the principal function of this wide construction of the gripping lips is to align the head piece on the rim coarsely or approximately into its proper position so as to allow the lug 44 to position itself properly and thereafter positively prevent any skewing of said head piece.

A modified means for moving the slide rod and tube relatively to each other is shown in Figs. 6, 7 and 8, wherein a bifurcated operating lever 28 is fulcrumed at 29 on the guide tube 202 and is pivotally connected at its inner extremity by a pivot pin 30 to a pair of shifting links 31, whose opposite ends are connected to a thrust or wrist pin 260 on the slide rod similar to one of the thrust pins 26. Thus by manually moving the operating lever 28 in one direction or the other, the slide rod 250 is caused to either slide inwardly or outwardly relatively to the guide tube, just as in the other construction. The lever 28 is provided with a stop 280 on its outer arm which is adapted to engage with the outer side of the outer tubular member 202 of the body when this lever has been turned into such a position that the pivotal connections at opposite ends of each link 31 are on a line with the fulcrum of this lever and thereby operate to hold this lever in its extreme operative position without requiring any additional locking device for this purpose.

A modified means of yieldingly pressing the engaging catches toward each other is shown in Fig. 9, where a coiled or helical spring 410 is wrapped around the pivot 40 and bears at its lower end against an adjacent part of the head piece 34 and at its upper end against an abutment 46 formed on the lower part of an engaging hook or catch 380. The hub 390 of this modified catch is preferably hollowed out or slotted suitably at 47 so as to receive the coiled spring 410 between its side walls adjacent to the slot. This modified engaging catch 380 is also provided with a combined finger piece and stop 48 projecting inwardly from the hub 390 of the engaging catch and adapted to limit the spreading movement of said catch and thereby eliminate any possibility of the coiled spring 410 getting out of place or being unduly strained as might otherwise possibly occur accidentally or as the result of rough usage. This finger-piece and stop is limited in its inward movement by either the slide rod 25 as shown in Fig. 9 or by the guide tube 22, as the case may be. The drawing shows that the two companion finger pieces 48 on either one of the head pieces are quite close together, so that when it is desired to open up the catches and disengage them from the rim entirely, these finger pieces can be pressed together with two fingers, so that only one hand is necessary for this disengaging operation.

It is evident that the exceedingly tedious and irksome task of applying tires to or removing the same from demountable rims can be greatly relieved by the use of this rim tool. To spread the rim it is merely necessary to move the operating nut 27 or the operating lever 28 as the case may be, in the proper direction. When it is desired to contract the rim, the operating means are first moved as before until the catches automatically snap over the rim edges of the tire rim and then the operation is reversed until the rim has been sufficiently contracted. Much hard labor is avoided and yet the tool itself is very simple and of durable construction, easily understood and manipulated and it can be manufactured at low cost.

I claim as my invention:

A tire tool comprising two supporting heads which are adapted to engage with opposing parts of the inner side of a split tire rim and each of which is provided on its opposite lateral sides with stops, means for moving said heads toward and from each other, a pair of catch levers pivoted on opposite sides of each head and having their outer arms adapted to engage said stops to limit their movement toward each other and provided on their opposing sides with hooks adapted to engage the opposite edges of a tire rim while the inner arms of said levers are constructed to form finger pieces for operating said levers, and springs arranged to constantly turn said catch levers in a direction in which the hooks of each pair of levers move toward each other.

CHARLES J. BUSH.